United States Patent
Uekawa et al.

(10) Patent No.: US 8,435,439 B2
(45) Date of Patent: May 7, 2013

(54) METHOD OF PRODUCTION OF CEMENT BONDED AGGLOMERATED ORE

(75) Inventors: Seita Uekawa, Tokyo (JP); Syuji Majima, Kimitsu (JP); Mitsumasa Kubo, Kimitsu (JP)

(73) Assignee: Tetsugen Corporation, Tokyo (JP)

( * ) Notice: Subject to any disclaimer, the term of this patent is extended or adjusted under 35 U.S.C. 154(b) by 361 days.

(21) Appl. No.: 12/736,362

(22) PCT Filed: Mar. 19, 2009

(86) PCT No.: PCT/JP2009/055399
§ 371 (c)(1),
(2), (4) Date: Oct. 28, 2010

(87) PCT Pub. No.: WO2009/122922
PCT Pub. Date: Oct. 8, 2009

(65) Prior Publication Data
US 2011/0037206 A1 Feb. 17, 2011

(30) Foreign Application Priority Data
Mar. 31, 2008 (JP) .................. 2008-089507

(51) Int. Cl.
*B28B 1/00* (2006.01)
(52) U.S. Cl.
USPC .......................... 264/603; 264/642
(58) Field of Classification Search .......... 264/603, 264/642
See application file for complete search history.

(56) References Cited

FOREIGN PATENT DOCUMENTS

| JP | 53-130202 | 11/1978 |
|----|-----------|---------|
| JP | 56-105432 | 8/1981 |
| JP | 58-133335 | 8/1983 |
| JP | 59-107036 | 6/1984 |
| JP | 63-083231 | 4/1988 |
| JP | 2008-163399 | 7/2008 |

OTHER PUBLICATIONS

International Search Report dated Jun. 16, 2009 issued in corresponding PCT Application No. PCT/JP2009/055399.
Tsuneo Miyashita et al. "Development of Continuous Rapid Curing Process for Cold Pellet and Evaluation of Physical Properties of Products" Journal of the Iron & Steel Institute of Japan vol. 69, No. 16, Dec. 1983, pp. 1974-1981.

*Primary Examiner* — Joseph Del Sole
*Assistant Examiner* — Russell Kemmerle, III
(74) *Attorney, Agent, or Firm* — Kenyon & Kenyon LLP

(57) ABSTRACT

A method of production of cement bonded agglomerated ore not depending on yard curing which can improve the environment, save labor, and improve yield is provided, that is, a method of production of cement bonded agglomerated ore which adds Portland cement as a binder to dust produced from an iron works and/or fine powder ore, treats the same by mixing, moisture adjustment, and kneading steps, then pelletizes it by a pan pelletizer and suitably thereafter cures it to produce blast furnace-use cold pellets or sintering-use minipellets having the required crushing strength, which method charges the raw pellets from the top of a vertical type container and discharges them from the bottom end to form a moving bed and cures the raw pellets in the period from charging to discharging.

1 Claim, 4 Drawing Sheets

METHOD OF PRODUCTION OF CEMENT BONDED AGGLOMERATED ORE

This application is a national stage application of International Application No. PCT/JP2009/055399, filed 19 Mar. 2009, which claims priority to Japanese Application No. 2008-089507, filed 31 Mar. 2008, which is incorporated by reference in its entirety.

TECHNICAL FIELD

The present invention relates to a method of production of cement bonded agglomerated ore.

BACKGROUND ART

In recent years, along with the tough measures to protect the environment, the amount of dust recycled at iron works has increased. This dust is agglomerated to pellets of a diameter of 10 to 20 mm for use as blast furnace material. As the method for this, the cold pellet method using a hydrating binder is being industrially applied. A specific method of this cold pellet method is shown in FIG. 5. FIG. 5 is a view showing a conventional process of production of blast furnace-use cold pellets by yard curing. As shown in the drawings, a material comprised of dust produced from an iron works and/or fine powder ore is mixed by a kneader using a binder of Portland cement, then pelletized by a pan pelletizer, screened, then cured at a primary curing yard for about 3 days to obtain the initial strength, the cured pile is crushed using a bulldozer at that point of time, the crushed pellets are piled up again at the secondary curing yard and further cured for 1 week to obtain a predetermined strength, then the pellets are discharged and used at the blast furnace.

As an example, as disclosed in, for example, Japanese Patent Publication (A) No. 53-130202 (Patent Citation 1), a method of production of dust cold pellets is proposed which adjusts the particle size constitution of the formulation of the metal-containing carbon dust produced by an iron works to within a suitable range of distribution of particle size by selecting the ratio of the coarse particles and fine particles by means of mixing in powdered ore in accordance with need and which sets a suitable moisture content and adds cement or another binder for granulation. Further, as disclosed in Japanese Patent Publication (A) No. 63-83231 (Patent Citation 2), the method of production of non-fired agglomerated ore is proposed which blends granulated blast furnace slag fine powder and gypsum into a powder iron-containing material and pelletizes or agglomerates together the result to produce non-fired pellets or briquettes during which time the granulated blast furnace slag fine powder and gypsum are finely pulverized to a specific surface area of 4000 $cm^2/g$ or more, then blended in to the iron-containing material at a state of 40° C. or more in a ratio of 6 to 9%, an alkali activator is added, water kneaded in, and the result agglomerated, then the agglomerate is piled up in a yard, then cured while maintaining its temperature.

On the other hand, as the method for treating dust more simply than the above cold pellet method, there is the sintering-use minipellet method. FIG. 6 is a view showing a conventional process of production of sintering-use minipellets. As shown in this drawing, the minipellet method of mixing a material comprised of dust produced from an iron works and/or fine powdered ore by a kneader using a binder of bentonite, then using a pan pelletizer to form small-sized pellets of a diameter of 2 to 7 mm, screening them, then directly charging the pellets to a sintering machine without curing is also industrially applied. In the above example, for example, as disclosed in Japanese Patent Publication (A) No. 59-107036 (Patent Citation 3), non-fired minipellets for sintering materials have been proposed which are obtained by adding moisture to non-carbon-containing dust produced in the different processes of an integrated iron and steelmaking works and covering the surfaces by blast furnace primary dust.

CITATION LIST

Patent Literature

[Patent Citation 1] Japanese Patent Publication (A) No. 53-130202
[Patent Citation 2] Japanese Patent Publication (A) No. 63-83231
[Patent Citation 3] Japanese Patent Publication (A) No. 59-107036

DISCLOSURE OF INVENTION

Technical Problem

The above-mentioned blast furnace-use cold pellet method requires curing yards and massive installation space. In particular, the secondary curing yard uses part of the ore yard, so there are the problems that the secondary curing yard reduces the ore yard capacity and that demurrage charges pile up in iron works with insufficient ore yard capacity. Further, with yard curing, after the primary curing, crushing work becomes necessary. The dust produced at that time becomes an environmental problem. Further, the crushing work involves human labor, and the crushing results in a drop in product yield.

Further, at the secondary curing yard, water is sprayed at the yard to prevent the generation of dust, so the moisture deposited at the cold pellets at the time of charging into the blast furnace becomes 7 to 8%. If combined with the water of crystallization accompanying the hydration reaction, the total moisture becomes over 10%. For this reason, if the amount of pellets used increases, the problem arises of the top temperature of the blast furnace being lowered, so there is the problem that, the amount of the pellets used at the blast furnace is limited.

On the other hand, in the sintering-use minipellet method, as a binder, usually bentonite is used to pelletize dust, so the crushing strength of the minipellet is 0.8 $kg/cm^2$ or so. Compared with a minipellet cured by using cement as a binder, the sintering-use minipellet is fragile. They easily are crushed and powderized by the dropping of the pellets into the sintering ore storage bin at the time of replenishment, the static pressure by the upper minipellets during storage in the ore storage bin, or the friction between minipellets while descending.

Further, the moisture of the minipellets is a high 12 to 15%. For this reason, sticking and hanging at the inside walls of the sintering ore storage bin easily occur. As a result, the rate of discharge of minipellets from the ore storage bin fluctuates. Due to the above reason, there are many examples where even if the minipellet method is introduced, the formation of minipellets is stopped and sticking is prevented by lowering the moisture to 10% or less for the supply of simple kneaded dust for sintering. As a result, a drop in sintering productivity is invited due to the deterioration of the gas permeability of the sintering bed accompanying the addition of fine powder dust.

Technical Solution

To solve the problems explained above, the inventors engaged in in-depth development efforts and as a result provided a method of production of cement bonded agglomerated ore. The invention has as its gist the following:

A method of production of cement bonded agglomerated ore which adds Portland cement as a binder to dust produced from an iron works and/or fine powder ore, treats the same by mixing, moisture adjustment, and kneading steps, then pelletizes it by a pan pelletizer and suitably thereafter cures it to produce blast furnace-use cold pellets or sintering-use minipellets having the required crushing strength, which method charges the raw pellets from the top of a vertical type container having the following three conditions and discharges them from the bottom end to form a moving bed and cures the raw pellets by a heat of hydration reaction of cement in the period from charging to discharging.

1) Having a bottom flaring taper of $1/10$ to $1/30$ at the entirety or top of the vertical type container body
2) Arranging at the bottom end of the vertical type container a table feeder of a size able to cover the entirety of the cross-sectional area of the bottom of the vertical type container and being able to guarantee the descent of the charged matter by a piston flow
3) Having a feeding device which, when the charging of raw pellets is stopped, immediately raises cured pellets discharged from the bottom of the vertical type container to the top of the vertical type container by a bucket elevator and supplies them instead of the raw pellets so as to be able to prevent the charging surface from dropping in the vertical type container.

Advantages Effects

As explained above, in the blast furnace-use cold pellet method according to the present invention, it is possible to eliminate the curing yards with their requisite massive installation spaces, so the production facility can be made more compact, the freedom of selection of the location for installation of the facility is increased, and the crushing work after primary curing becomes unnecessary, so improvement of the environment, labor saving, and improvement of yield become possible. Further, at iron works with insufficient ore yards, the demurrage charges can be slashed by changing the yard curing system to the present invention. Furthermore, to dry the cold pellets, it is possible to avoid a drop in the furnace top temperature at the time of use of the blast furnace, so it is possible to increase the amount used in the blast furnace.

Further, in the minipellet method according to the present invention, the idea of using Portland cement as a binder to produce the minipellets can be easily conceived of, but with the conventional yard curing method, there are the problem of the curing yard installation space, the environmental problem due to the generation of dust at the time of crushing after curing, the problem of the manpower for the crushing, and the problem of the drop in yield accompanying the crushing, so there has been no example of industrial utilization, but according to the present invention, the above problems are solved. In addition, it is possible to give sufficient strength for preventing crushing and powderization of minipellets in the sintering ore storage bin and possible to avoid deposition and hanging at the inside walls of the sintering ore bin due to supply after sufficient strength is given.

Furthermore, as a result of the above, the simple dust treatment method, that is, the minipellet method, becomes industrially feasible, the drop in productivity of the sintering accompanying direct addition of dust can be avoided, and other extremely superior effects can be exhibited.

Other features and advantages of the present invention will become clearer from the following explanation given with reference to the attached drawings. Note that, in the attached drawings, the same or similar components are assigned the same reference numerals.

BRIEF DESCRIPTION OF THE DRAWINGS

FIG. 3 is an overall schematic view showing the functions which a vertical type container according to the present invention should be provided with.

BEST MODE FOR CARRYING OUT THE INVENTION

Figure 1:
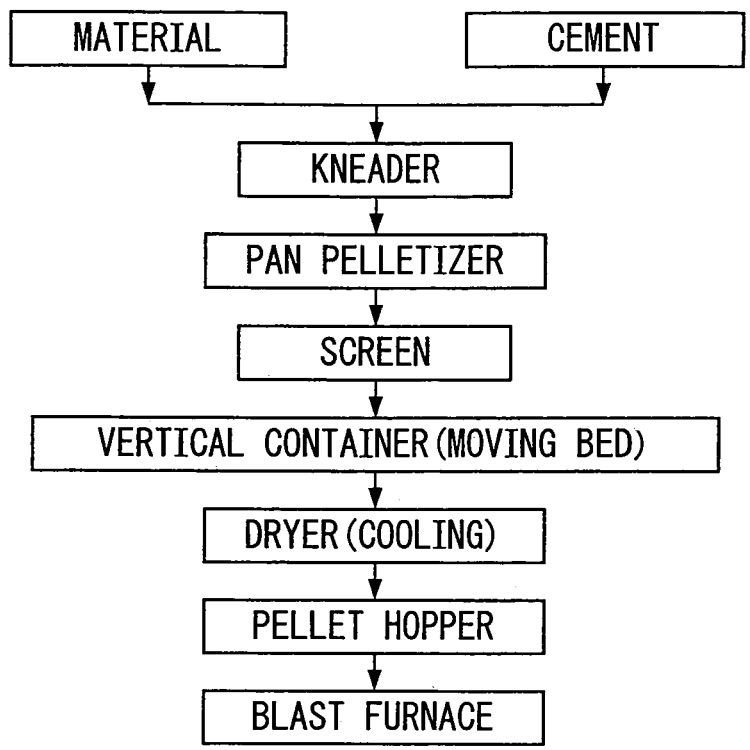
FIG. 1 is a view showing a process of production of blast furnace-use cold pellets according to the present invention.
Figure 5:
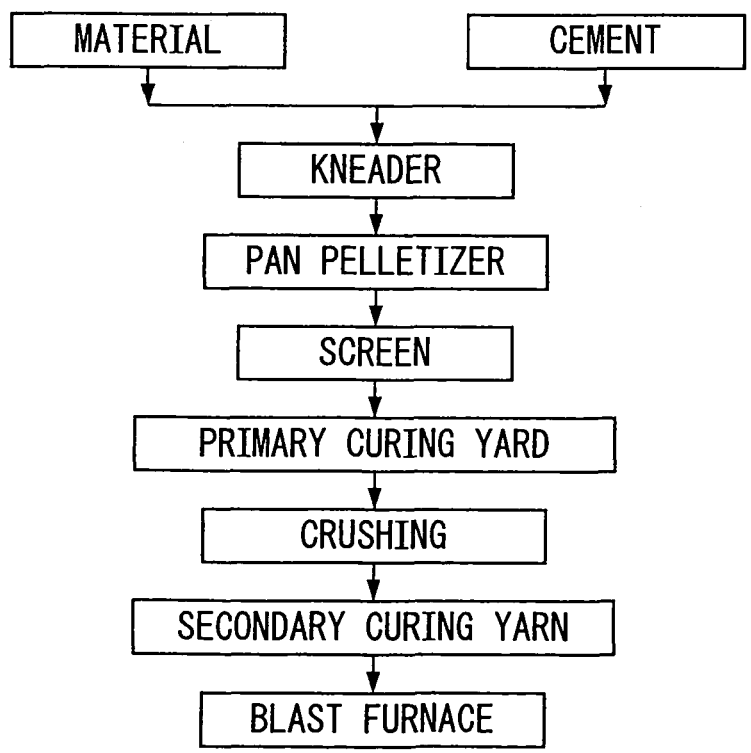
FIG. 5 is a view showing a process of production of blast furnace-use cold pellets by conventional yard curing.
Figure 6:
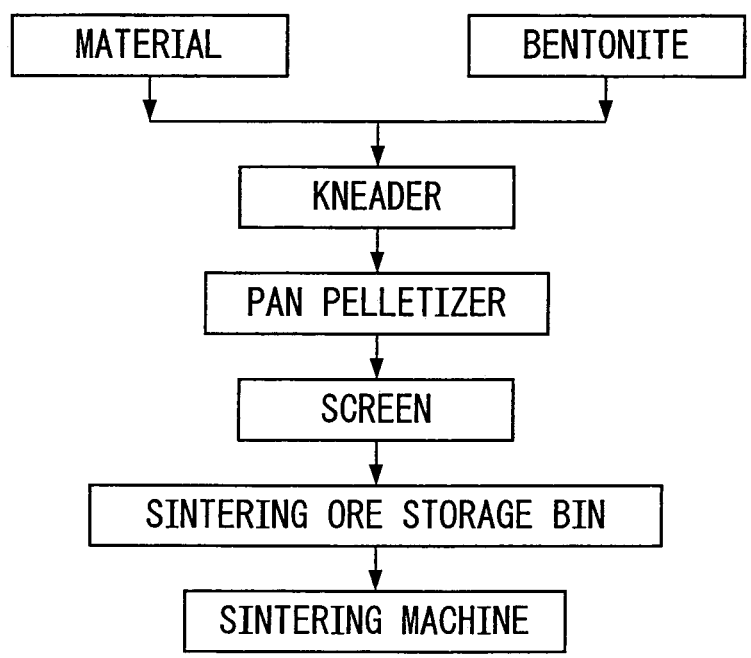
FIG. 6 is a view showing a process of production of conventional sintering use minipellets.

Below, the present invention will be explained in detail in accordance with the drawings. FIG. 1 is a view showing a process of production of blast furnace-use cold pellets according to the present invention. As shown in FIG. 1, the primary curing yard and secondary curing yard of the conventional method shown in FIG. 5 are replaced by a vertical type container and dryer in the present invention so as to provide a method of production not requiring yard curing. Note that, details of the vertical type container will be explained later. The type of the dryer is not an issue so long as a continuous type. A band dryer, vertical moving bed type dryer, etc. may be employed.

Figure 2:
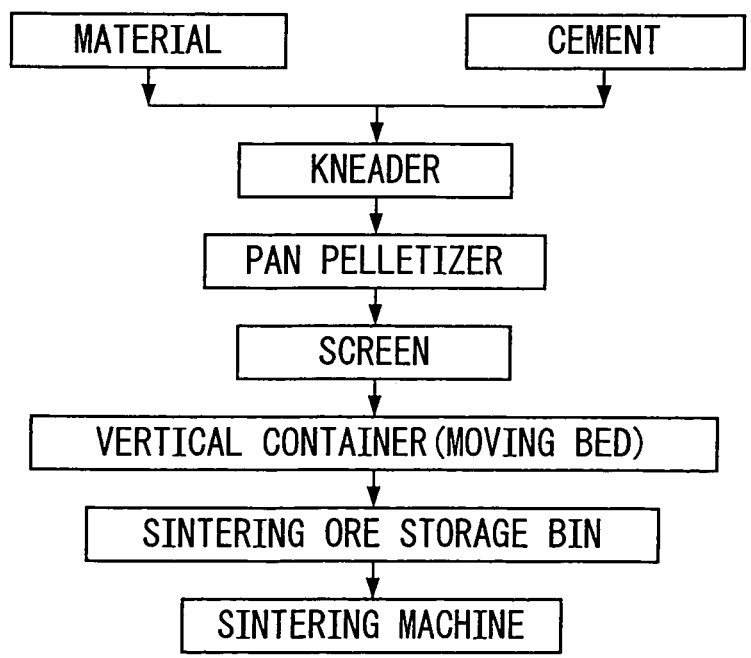
FIG. 2 is a view showing a process of production of sintering use minipellets of the present invention.
Figure 3:
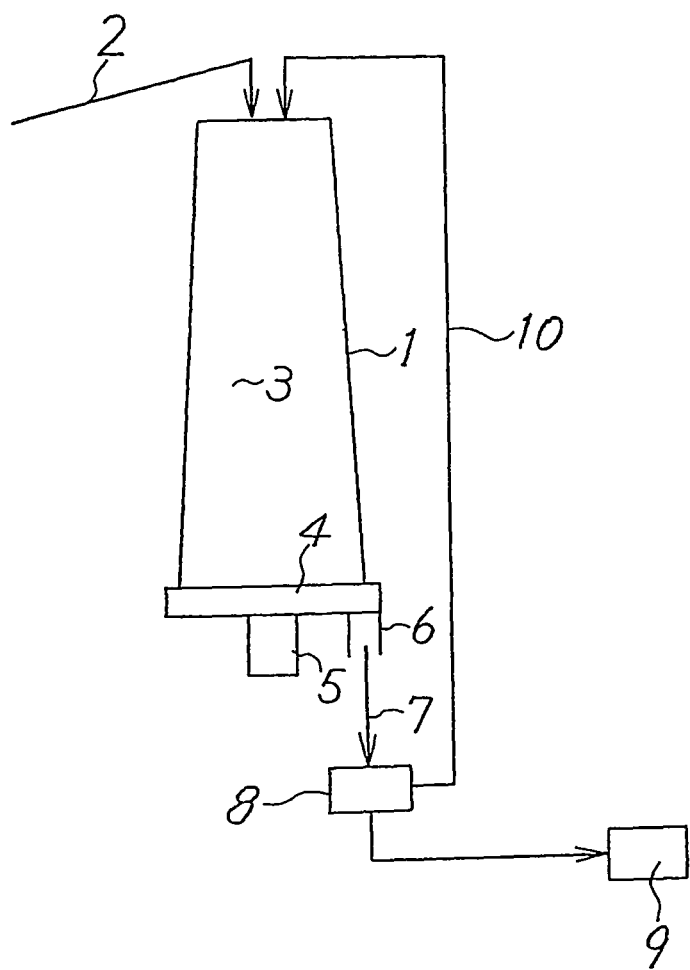

FIG. 2 is a view showing a process of production of sintering-use minipellets of the present invention. As shown in FIG. 2, Portland cement is used as a binder to cure the minipellets until a predetermined strength in the vertical type container, then these are fed to the sintering ore storage bin so as to thereby provide a method of production not requiring yard curing. FIG. 3 is an overall schematic view showing the functions which the vertical type container according to the present invention should be provided with. Raw pellets 2 are charged from the top of the vertical type container 1. The charged matter forms a continuously descending moving bed 3 until a table feeder 4 arranged at the bottom of the inside of the vertical type container 1 dishcarges cured ore agglomerate 7.

While the moving bed 3 is moving from the top to the bottom end, the hydration reaction of the Portland cement causes the raw pellets 2 to cure. The curing proceeds up to a predetermined strength, whereafter the pellets are discharged from the discharge port 6 of the table feeder 4 due to rotation of the drive device 5. The discharged cured agglomerated ore 7 are transported through the switching device 8 to the next step 9 at steady times, but at non-steady times such as idling of the process of production of the raw pellets, the switching device 8 is switched to recharge the agglomerates by the bucket elevator 10 to the top of the vertical type container 1.

The vertical type container 1 is basically shaped to flare out downward. The blast furnace-use cold pellets and sintering-use minipellets have moistures after granulation of 10 to 13% and 12 to 15% or so, so have the property of extremely easy sticking to the walls of the vertical type container. For this reason, by making the container flare out downward, sticking and hanging are prevented. Further, by making it flare out downward, lateral direction movement is added to the movement in the bottom direction along with discharge of the charged matter, so the effect of suppression of sticking of cement bonded agglomerated ore with each other becomes greater. Regarding the extent of the taper of the bottom flare, the optimum angle is 1/10 to 1/30.

Further, to reliably secure the predetermined curing time for all of the charged matter, it is important to prevent the phenomenon of material charged later being discharged first. For this reason, it is necessary to provide a feeding device like a table feeder able to ensure that the charged matter descends by the piston flow. For example, this can be handled by employing a table feeder of a size able to cover the entire cross-sectional area of the bottom of the vertical type container.

Further, to prevent the cement bonded agglomerated ore from sticking to each other in the vertical type container due to the hydration reaction, it is necessary to continue to make the charged matter move at a predetermined descent rate at all times. Therefore, if the pelletization system breaks down and stops, the charge of the raw pellets stops. As a result, the top level of the charged matter inside the vertical type container continues to fall. If resuming operation of the pelletization system in the state with the surface of the charged matter considerably fallen, the low strength raw pellets will be allowed to fall to the surface of the charged matter. In this case, the raw pellets cannot withstand the dropping impact and end up being crushed To prevent this problem from occurring, after the surface of the charged matter starts to fall, it is necessary to charge cured agglomerated ore discharged from the vertical type container immediately from the top of the vertical type container and hold the surface of the charged matter of the vertical type container at a steady position. The cured ore agglomerate need not be discharged from the vertical type container. For example, it is also possible to charge cured ore agglomerate stored in a separately stored bin. After the pelletization system is restored from the broken down state, the charge of the cured agglomerated ore is stopped and the charge of raw pellets is resumed. Further, when the pelletization system is idled for a long time due to periodic repair of the factory, the charge of the cured agglomerated ore continues until the charged matter inside the vertical type container is completely replaced by the cured agglomerated ore. When replacement is completed, the charging and discharging are stopped.

Figure 4:
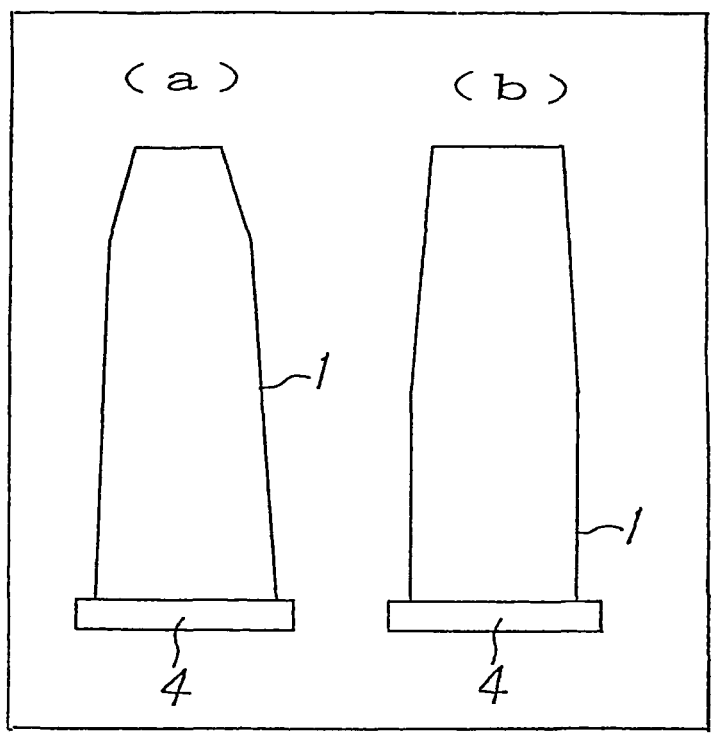
FIG. 4 is a view showing various type's of shapes of a vertical type container.

Regarding the shape of the vertical type container 1, not only a simple downward flare, but also various other shapes such as shown in (a) and (b) of FIG. 4 may be employed. When the cement bonded agglomerated ore would easily stick to each other right after pelletization, increasing the descent rate and increasing the taper at the top of the vertical type container so as to increase movement in the lateral direction is effective for preventing sticking. In this case, the shape of (a) of FIG. 4 is preferable. The taper is made 1/10 at the top 1/4 of the vertical type container and 1/20 at the bottom 3/4. Conversely, when the agglomerated ore are resistant to sticking with each other, as shown by (b) of FIG. 4, the taper can be eliminated in a bottom part of the body and the bottom part of the body can also be made straight. The top taper of the body at this time is made 1/10 to 1/30.

EXAMPLES

Below, the present invention will be explained specifically using examples. As shown in Table 1, the vertical type container is used to produce blast furnace-use cold pellets. Further, Table 2 shows the formulation of the dust and powder ore used as materials of the blast furnace-use cold pellets. For the powder ore, sintering-use ore pulverized in advance by a ball mill so that about 60% becomes −44 μm is used. Table 1 shows the results of three-level operations with target strengths of the cured pellets set to 100, 120, and 160 kg/cm² performed two times each.

TABLE 1

| | Target strength of cured pellets (kg/cm²) | | | | | |
|---|---|---|---|---|---|---|
| | 100 | | 120 | | 160 | |
| | Test no. | | | | | |
| | 1 | 2 | 3 | 4 | 5 | 6 |
| Type of mixed material | 1 | | 2 | | 3 | |
| Mixing ratio of high early strength cement (%) | 9.0 | | 10.0 | | 11.0 | |
| Raw pellet strength (kg/cm²) | 1.6 | 1.5 | 1.9 | 1.7 | 2.2 | 2.4 |
| Strength Before drying after curing for 24 hours (kg/cm²) | 70.7 | 65.9 | 91.0 | 75.1 | 110.8 | 102.4 |
| After drying | 106.1 | 91.0 | 122.1 | 117.1 | 156.9 | 160.0 |
| Before/after ratio (%) | 66.6 | 72.4 | 74.5 | 64.1 | 70.6 | 64.0 |

TABLE 2

| Type No. of mixed materials | Converter coarse dust | Converter fine dust | Blast furnace primary dust | EP dust | Cold pellet sieved undersize | Powder ore (crushed powder) | High early strength cement | Total |
|---|---|---|---|---|---|---|---|---|
| 1 | 30.0 | 10.0 | 14.0 | 30.0 | 7.0 | 0.0 | 9.0 | 100 |
| 2 | 30.0 | 16.0 | 11.0 | 27.0 | 6.0 | 0.0 | 10.0 | 100 |
| 3 | 24.5 | 4.0 | 27.0 | 11.0 | 2.5 | 20.0 | 11.0 | 100 |

For high early strength cement, the mixing ratio was set in accordance with the type of the mixed material and target strength.

The operation was performed with a taper of the vertical type container of 1/20, an average descent rate of 1.39 cm/min, and a retention time of 24 hours. The crushing strength when discharging the pellets from the vertical type container after 24 hours (shown as "strength before drying") and the crushing strength when drying this by a band dryer at 200° C. for 30 minutes to a moisture of less than 1%, then cooling (shown as "strength after drying") are shown. The ratio of the strength before drying and the strength after drying is the "before/after ratio (%)". If viewing the results of the operation, the value of the strength after drying becomes a value close to the target strength. Cold pellets able to sufficiently withstand use in a blast furnace could be produced.

Further, the inventors learned from the values of the before/after ratio (%) that if setting the type of the Portland cement, addition rate, and retention time in the vertical type container so that the crushing strength of the cured pellets becomes 60% to 80% or so of the target strength of the cured pellets, the cured pellets after drying become ones of a crushing strength close to the target strength. When desiring to shorten the retention time, preparation is also possible by using a super high early strength cement or hydration reaction accelerator.

Note that, the reason why drying the cured pellets increases the strength until the strength of 60% to 80% becomes 100% is believed to be as follows. By drying in the initial hydration of 24 hours or so, the water present between the dust particles evaporates and the particles agglomerate. This is due to the capillary tube tension calculated by the surface tension of the water and the radius of curvature of the water present between the particles. The interatomic force (Van de Waals' force) also acts. For this reason, the pellets shrink and increase in strength. Further, there are also cement particles in the water. These form hydrates. The promotion of hydration due to the temperature also contributes to the improvement of the strength.

Note that, if the curing time becomes longer, the hydration of the cement progresses and a certain extent of structure forms, so shrinkage between particles is constrained, therefore the increase in strength due to drying becomes slight. The inventors engaged in various studies and as a result learned that a remarkable increase in strength is seen due to drying in combinations of dust and high early strength cement in 24 hours to 72 hours and that when over 120 hours, the increase in strength becomes slight. Therefore, in the examples of the present invention, from the viewpoint of reducing the size of the vertical type container, the curing time was made 24 hours. Further, even in existing yard curing, it is possible to eliminate the secondary curing yard by drying the pellets finished being treated in the primary curing yard.

Next, examples using a vertical type container to produce sintering-use minipellets for use as up to 5% of the mixed materials in the sintering machine are shown in Table 3. Further, Table 4 shows the formulation of the dust used as the material of the minipellets. This operation is performed in two levels changing the mixing ratio of the high early strength cement. The operation is performed at a taper of the vertical type container of 1/10 at the top 1/4 of the vertical type container body and 1/20 at the bottom 3/4, an average rate of descent of 1.39 cm/min, and a retention time of 24 hours. The crushing strength after being discharged from the vertical type container after 24 hours and the strength of the raw pellets right after pelletization are shown.

TABLE 3

|  | Test No. | |
| --- | --- | --- |
|  | 1 | 2 |
| High early strength cement mixing ratio (%) | 2.0 | 3.0 |
| Raw pellet strength (kg/cm$^2$) | 0.8 | 0.9 |
| Strength after 24 hours curing (kg/cm$^2$) | 6.6 | 9.8 |
| 1/5 · HρB (kg/cm$^2$) (H = 20 m, ρB = 1.4 t/m$^3$) | 5.6 | 5.6 |
| Sintering productivity when mixing in 5% minipellets (t/d · m$^2$) | 28.1 | 28.6 |
| Productivity when adding minipellet materials as is (t/d · m$^2$) | 26.1 | 26.1 |
| Effect of improvement of sintering productivity when converted to minipellets (%) | 107.6 | 109.5 |

TABLE 4

| Test no. | Sintering process Dust 1 | Sintering process Dust 2 | Blast furnace primary dust | Blast furnace secondary dust | Converter coarse dust | Converter fine dust | High early strength cement | Total |
| --- | --- | --- | --- | --- | --- | --- | --- | --- |
| 1 | 21.3 | 5.6 | 13.2 | 12.5 | 11.8 | 33.6 | 2.0 | 100 |
| 2 | 21.3 | 5.6 | 13.2 | 12.5 | 11.8 | 32.6 | 3.0 | 100 |

Table 3 shows that the reference strength 1/5·HρB (kg/cm$^2$) which the crushing strength of the cured pellets discharged from the vertical type container should reach when the height of the vertical type container is H (m) and the bulk density of the raw pellets charged into the vertical type container is ρB (t/m$^3$).

The static pressure due to the upper minipellets applied to the minipellets at the bottommost part of the vertical type container becomes 1/10·HρB due to the elimination of the wall effect due to the bottom flare, but there is considerable fluctuation in the crushing strength of the minipellet particles. Considering the fact that there are also particles with only a considerably low strength compared with the average, from the viewpoint of keeping powderization to a minimum, double that is made the standard value. The standard values can be achieved by the results of the two-level operation. The inventors mixed these two levels of minipellets in the mixed materials of the sintering machine in 5% and operated the sintering machine. As a result, compared with the case of adding the dust as is without conversion to minipellets, it was possible to achieve improvements of productivity of 107.6% and 109.5%.

INDUSTRIAL APPLICABILITY

As explained above, according the blast furnace-use cold pellet method of the present invention, it is possible to eliminate the curing yard with its requisite massive installation space, so it becomes possible to make the production facility more compact, the freedom of selection of the location for installation of the facility is increased, and the crushing work after primary curing becomes unnecessary, so improvement of the environment, labor saving, and improvement of yield become possible. Further, at iron works with insufficient ore yards, the demurrage charges can be reduced by changing the yard curing system to the present invention. Furthermore, the cold pellets are dried, so a drop in the top temperature at the time of use of the blast furnace can be avoided, so the amount of pellets used in the blast furnace can be increased.

Furthermore, as a result of the above, a simple dust treatment method, that is, the minipellet method, becomes industrially feasible and a drop in productivity of sintering accompanying direct addition of dust is avoidable. This method is suitable for use for methods similar to it.

The present invention is not limited to the above embodiments and can be changed and modified in various ways without departing from the spirit and scope of the present invention. Therefore, to make public the scope of the present invention, the following claim is attached.

The present invention claims priority based on Japanese Patent Application No. 2008-89507 filed on Mar. 31, 2008 and cites all of the content of its description by reference.

The invention claimed is:

1. A method of production of cement bonded agglomerated ore which adds Portland cement as a binder to dust produced from an iron works and/or fine powder ore, treats the same by mixing, moisture adjustment, and kneading steps, then pelletizes it by a pan pelletizer and suitably thereafter cures it to produce blast furnace-use cold pellets or sintering-use minipellets having the required crushing strength, which method charges the raw pellets from the top of a vertical type container having the following three conditions and discharges them from the bottom end to form a moving bed and cures the raw pellets by a heat of hydration reaction of cement in the period from charging to discharging:

1) Having a bottom flaring taper of $1/10$ to $1/30$ at the entirety or top of the vertical type container body;
2) Arranging at the bottom end of the vertical type container a table feeder of a size able to cover the entirety of the cross-sectional area of the bottom of the vertical type container and being able to guarantee the descent of the charged matter by a piston flow; and
3) Having a feeding device which, when the charging of raw pellets is stopped, immediately raises cured pellets discharged from the bottom of the vertical type container to the top of the vertical type container by a bucket elevator and supplies them instead of the raw pellets so as to be able to prevent the charging surface from dropping in the vertical type container.

* * * * *

UNITED STATES PATENT AND TRADEMARK OFFICE
CERTIFICATE OF CORRECTION

PATENT NO. : 8,435,439 B2  Page 1 of 1
APPLICATION NO. : 12/736362
DATED : May 7, 2013
INVENTOR(S) : Uekawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this
Eighth Day of September, 2015

Michelle K. Lee
*Director of the United States Patent and Trademark Office*